United States Patent [19]
Albrecht

[11] Patent Number: 5,809,351
[45] Date of Patent: Sep. 15, 1998

[54] DUAL WHEEL FRAME COUNTER

[75] Inventor: Thomas S. Albrecht, Canandaigua, N.Y.

[73] Assignee: Eastman Kodak Company, Rochester, N.Y.

[21] Appl. No.: 854,935

[22] Filed: May 13, 1997

[51] Int. Cl.⁶ ........................................ G03B 1/66

[52] U.S. Cl. ............................. 396/284; 396/411

[58] Field of Search ..................... 396/284, 411

[56] References Cited

U.S. PATENT DOCUMENTS 1,642,818  9/1927  Lessler et al. .
1,888,134  11/1932  Kunkler .

*Primary Examiner*—David M. Gray
*Attorney, Agent, or Firm*—Roger A. Fields

[57] ABSTRACT

A dual wheel frame counter comprises a tenths counter wheel having a series of ten or less evenly spaced units and respective evenly spaced actuated members equal in number to the series of at least two units, and a unit counter wheel having a series of ten evenly spaced units which correspond to the series of at least two units of the tenths counter wheel and a single actuating member which successively actuates the actuated members to rotate the tenths counter wheel one unit in response to each rotation of the unit counter wheel ten units. The unit counter wheel includes an opposed-end concentric channel having an opening between opposite ends of the channel. The single actuating member constitutes a protuberance on the unit counter wheel which is positioned in the opening to leave respective ingress and egress spaces in the opening between the protuberance and the opposite ends of the channel. The actuated members are positioned on the tenths counter wheel for the protuberance to drive one of the actuated members out of the channel through the egress space to rotate the tenths counter wheel one unit and move another of the actuated members into the channel through the ingress space each time the unit counter wheel is rotated ten units. The fact that one of the actuating members is always in the channel serves to prevent any unintended rotation of the tenths counter wheel with respect to the unit counter wheel.

3 Claims, 7 Drawing Sheets

DUAL WHEEL FRAME COUNTER

FIELD OF THE INVENTION

The invention relates generally to the field of photography, and in particular to frame counters included in cameras. More specifically, the invention relates to a dual wheel type of frame counter.

BACKGROUND OF THE INVENTION

A frame counter is a precision measuring mechanism built into a camera to show the actual number of individual frames of a filmstrip that have been exposed or are to be exposed in the camera. In one instance, the frame counter is incremented from "0" to the maximum number of exposures, for example 15, 24 or 36. In the other instance, the frame counter is decremented from the maximum number of exposures to "0".

Prior art U.S. Pat. No. 1,642,818 issued Sep. 20, 1927 discloses a dual wheel type of frame counter comprising a count-by-unit counter wheel having ten evenly spaced units and a single actuating pawl, and a count-by-tenths counter wheel having ten evenly spaced units which are the same as the ten units of the unit counter wheel and respective peripheral teeth which correspond to the ten units of the tenths counter wheel. The actuating pawl on the unit counter wheel successively engages the peripheral teeth on the tenths counter wheel to rotate the tenths counter wheel one unit in response to each rotation of the unit counter wheel ten units. The ten units on the unit counter wheel and the ten units on the tenths counter wheel are designated "0", "1", "2", "3", "4", "5", "6", "7", "8", and "9" on respective top sides of the two counter wheels. The unit counter wheel is incrementally rotated ten times to move the designations "1", "2", "3", "4", "5", "6", "7", "8", "9", "0" on the unit counter wheel successively into and out of a counter window in the casing of the camera. When the designation "0" on the unit counter wheel is moved into the counter window, following movement of the designation "9" on the unit wheel out of the counter window, actuating pawl on the unit counter wheel engages one of the peripheral teeth on the tenths counter wheel to incrementally rotate the tenths counter wheel to move one of the designations "0", "1", "2", "3", "4", "5", "6", "7", "8" and "9" on the tenths counter wheel out of the counter window and move the next higher designation on the tenths counter wheelscan provide a frame count from "01" to "99". This is particularly useful when a relatively long length of film is used in the camera.

A possible problem with the dual wheel frame counter disclosed in U.S. Pat. No. 1,642,818 is that the engagement of the actuating pawl on the unit counter wheel with any one of the peripheral teeth on the tenths counter wheel is momentary, rather than continuous. Consequently, whenever the actuating pawl is not engaged with one of the peripheral teeth, a mechanical shock to the frame counter, for example, should the camera be dropped, could move the tenths counter wheel to be out of count.

SUMMARY OF THE INVENTION

According to the invention, a dual wheel frame counter comprising a tenths counter wheel having a series of at least two evenly spaced units and respective evenly spaced actuated members equal in number to the series of at least two units, and a unit counter wheel having a series of ten evenly spaced units which correspond to the series of at least two units of the tenths counter wheel and a single actuating member which successively actuates the actuated members to rotate the tenths counter wheel one unit in response to each rotation of the unit counter wheel ten units, is characterized in that:

the unit counter wheel includes an opposed-end concentric channel having an opening between opposite ends of the channel;

the single actuating member constitutes a protuberance on the unit counter wheel which is positioned in the opening to leave respective ingress and egress spaces in the opening between the protuberance and the opposite ends of the channel; and the actuated members are positioned on the tenths counter wheel for the protuberance to drive one of the actuated members out of the channel through the egress space to rotate the tenths counter wheel one unit and move another of the actuated members into the channel through the ingress space each time the unit counter wheel is rotated ten units.

The fact that one of the actuating members is always in the channel serves to prevent any unintended rotation of the tenths counter wheel with respect to the unit counter wheel.

DETAILED DESCRIPTION OF THE INVENTION

The invention is disclosed as being embodied preferably in a frame counter in a camera. Because the features of a frame counter in a camera are generally known, the description which follows is directed in particular only to those elements forming part of or cooperating directly with the disclosed embodiment. It is to be understood, however, that other elements may take various forms known to a person of ordinary skill in the art.

Figure 1:
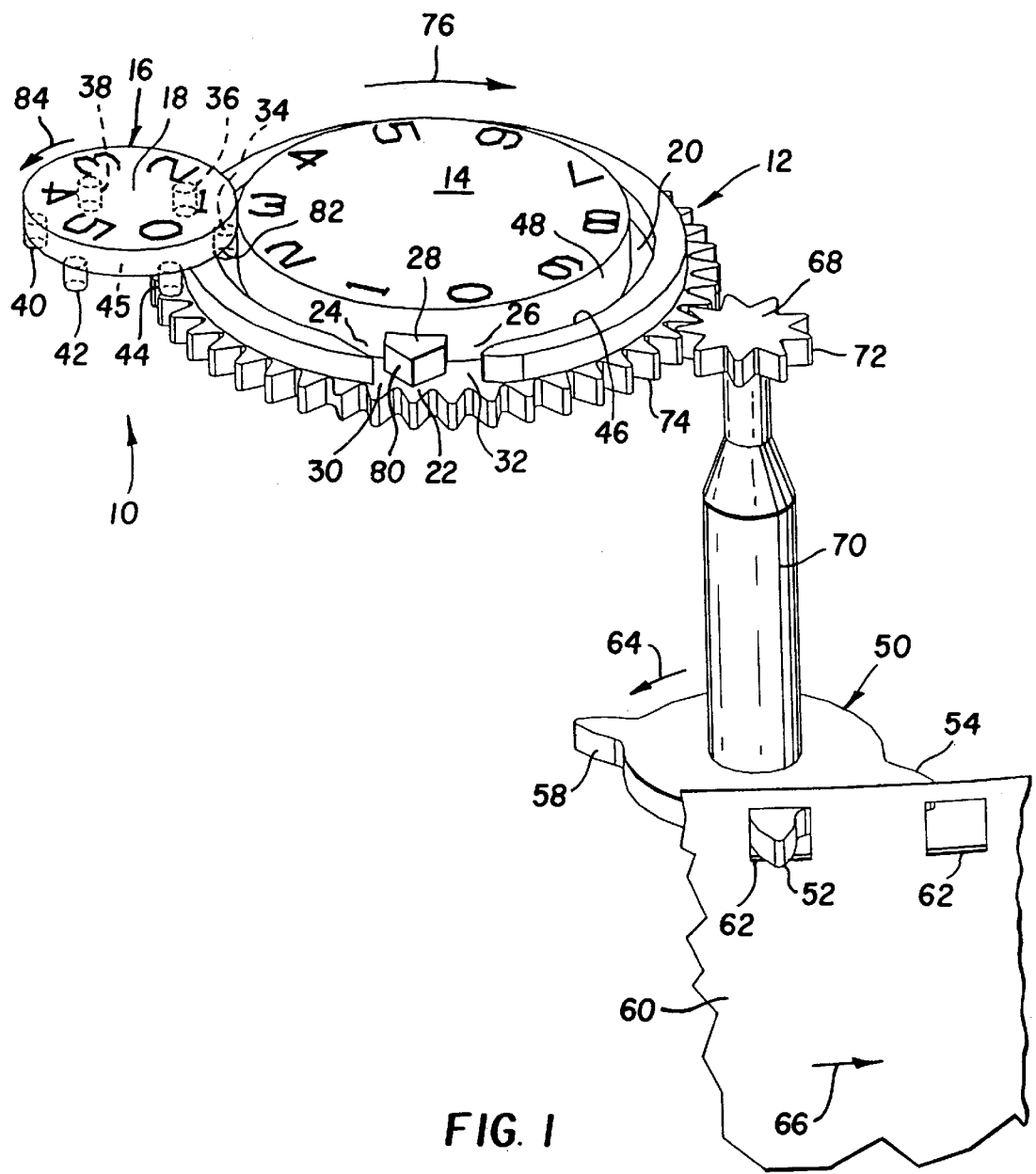
FIG. 1 is a perspective view of a dual wheel frame counter pursuant to a preferred embodiment of the invention.
Figure 2:
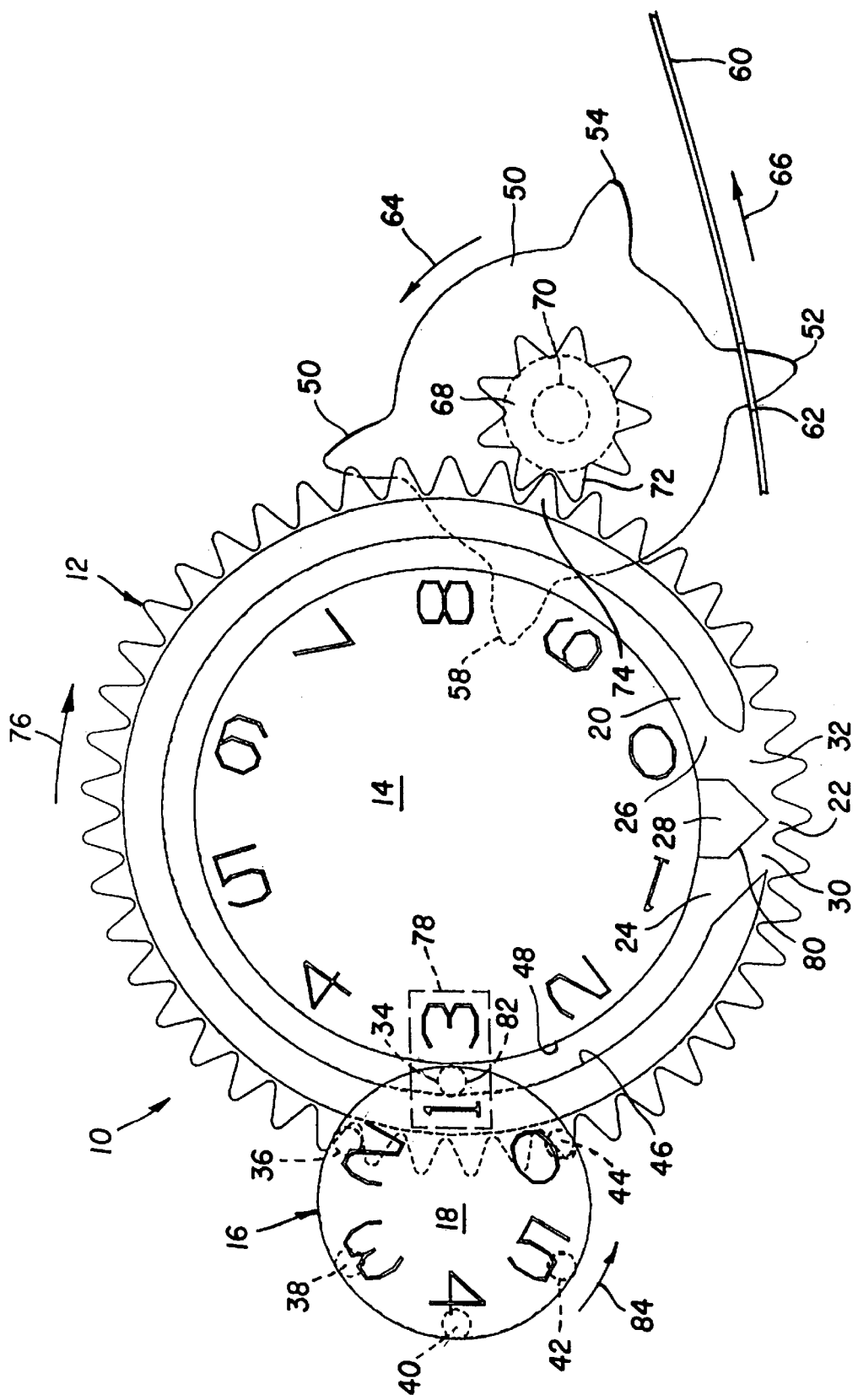
FIG. 2 is a top plan view of the dual wheel frame counter.

Referring now to the drawings, FIGS. 1 and 2 show a dual wheel frame counter 10 comprising a count-by-unit counter wheel 12 having concentric series of ten evenly spaced consecutive units on its top side 14 and a count-by-tenths counter wheel 16 having a concentric series of five evenly spaced consecutive units on its top side 18 which are the same as the first five units of the unit counter wheel. The ten consecutive units on the top side 14 of the unit counter wheel 12 are designated "0", "1", "2", "3", "4", "5", "6", "7", "8" and "9". The five consecutive units on the top side 18 of the tenths counter wheel 14 are designated "0", "1", "2", "3", "4" and "5".

The top side 14 of the unit counter wheel 12 has an opposed-end concentric channel 20 with an opening 22 between opposite ends 24 and 26 of the channel, and an actuating protuberance 28 which is radially positioned in the opening to leave respective egress and ingress spaces 30 and 32 in the opening between the actuating protuberance and the opposite ends of the channel. See FIGS. 1 and 2.

The tenths counter wheel 16 includes a concentric arrangement of five evenly spaced pins 34, 36, 38. 40, 42 and 44 positioned on an underside 45 of the tenths counter wheel. See FIGS. 1 and 2. In FIGS. 1 and 2, the pin 34 is located in the channel 20, held captive between a pair of concentric outer and inner walls 46 and 48 of the channel, and the pins 38, 40, 42 and 44 are located outside the channel. However, as will become apparent from the description of operation which follows, any one of the pins 34, 36, 38. 40, 42 and 44 can be located in the channel 20 one at a time.

Figure 4:
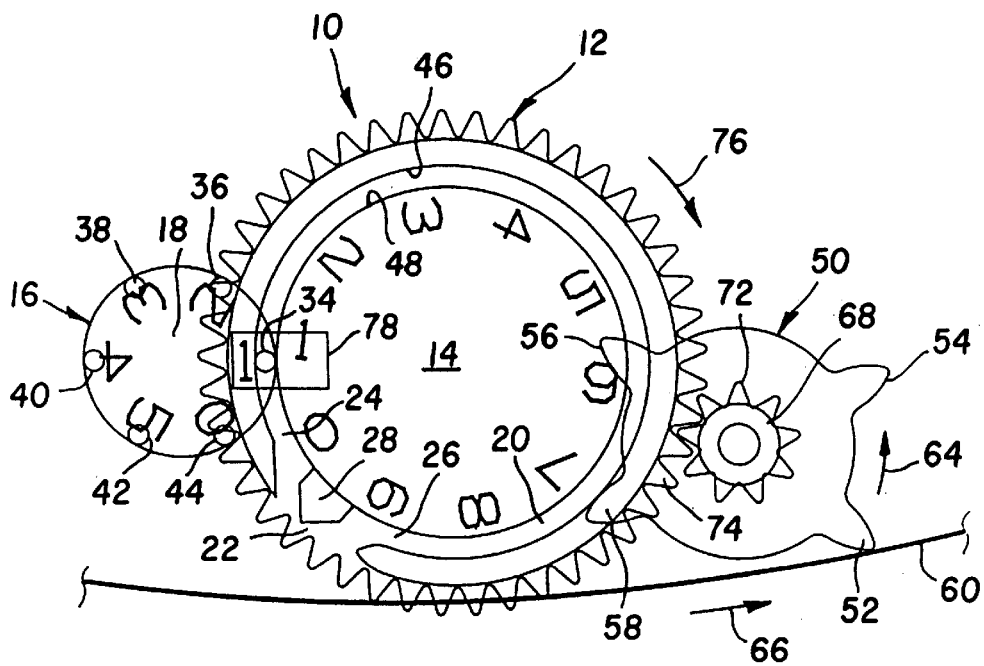
Figure 5:
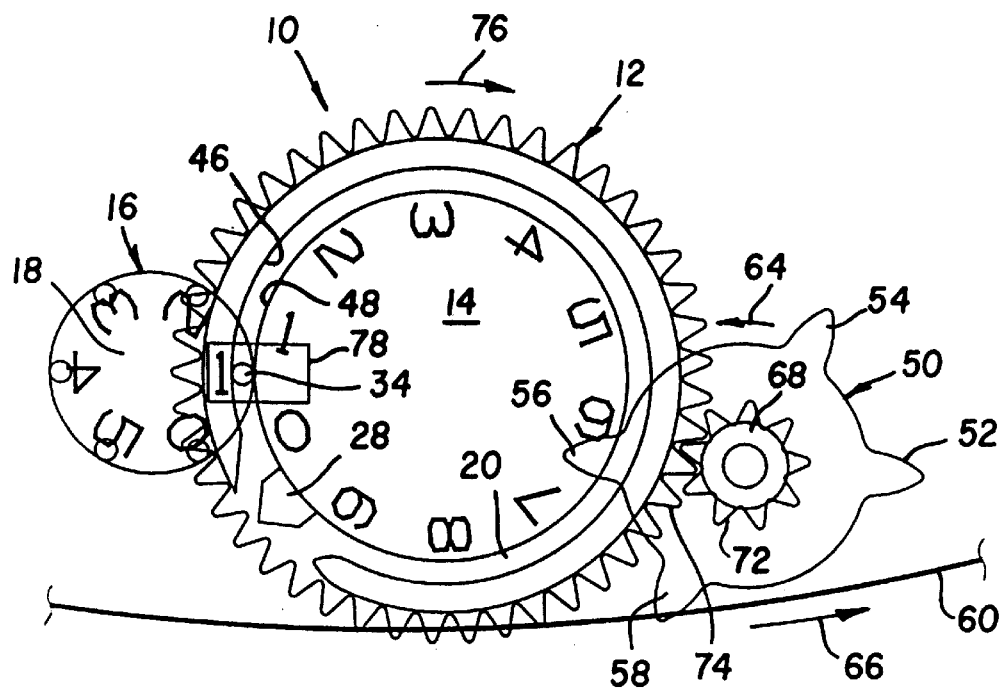
Figure 6:
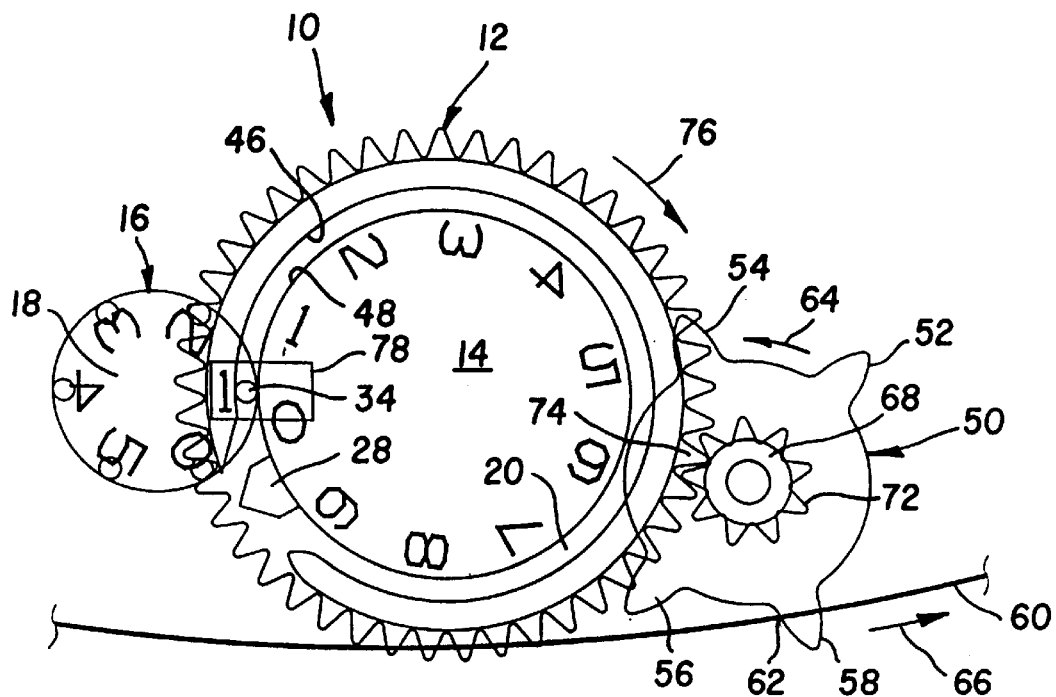

A conventional metering sprocket 50 has four metering teeth 52, 54, 56 and 58 successively engageable with a conventional filmstrip 60 at respective perforations 62 in the filmstrip to rotate the metering sprocket in the direction 64 in FIG. 2 when the filmstrip is advanced in the direction 66 in FIG. 2. When none of the metering teeth 52, 54, 56 and 58 are engaged with any one of the perforations 62, as shown in FIG. 4, a light torsion spring (not shown) urges the metering sprocket 50 in the direction 64 to move the next tooth into one of the perforations. A pinion 68 coaxially connected via a shaft 70 to the metering sprocket 50 has peripheral teeth 72 which successively engage with respective teeth 74 of the unit counter wheel 12 to rotate the unit counter wheel in the direction 76 in FIG. 2, when the metering sprocket is rotated in the direction 64.

Operation

Figure 3:
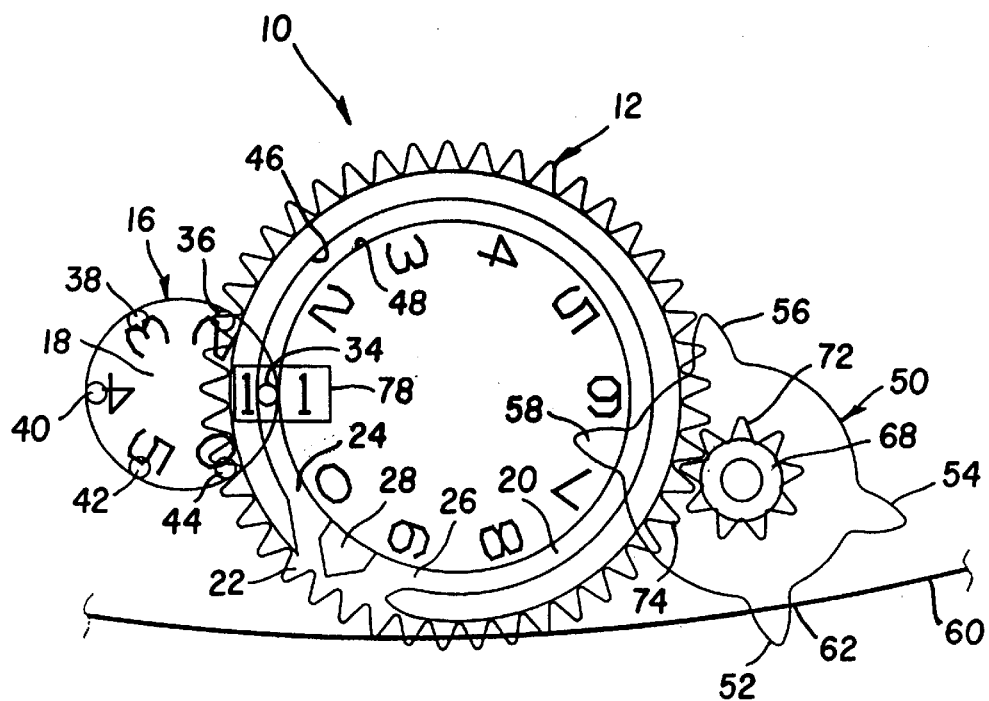
FIGS. 3–11 are top plan views similar to FIG. 2, depicting operation of the dual wheel frame counter.

FIG. 3 shows the filmstrip 60 in what is commonly referred to as a "metered" position, ready to be exposed in a camera. In this instance, the metering tooth 52 of the metering sprocket 50 is engaged with the filmstrip 60 at one of the perforations 62, the pin 34 on the tenths counter wheel 16 is located in the channel 20, held captive between the pair of concentric outer and inner walls 46 and 48 of the channel, and the unit "1" on the unit counter wheel 12 and the unit "1" on the tenths counter wheel 16 are positioned side-by-side in a counter window 78 of the camera to indicate there are "11" frames remaining on the filmstrip 60 to be exposed.

Figure 7:
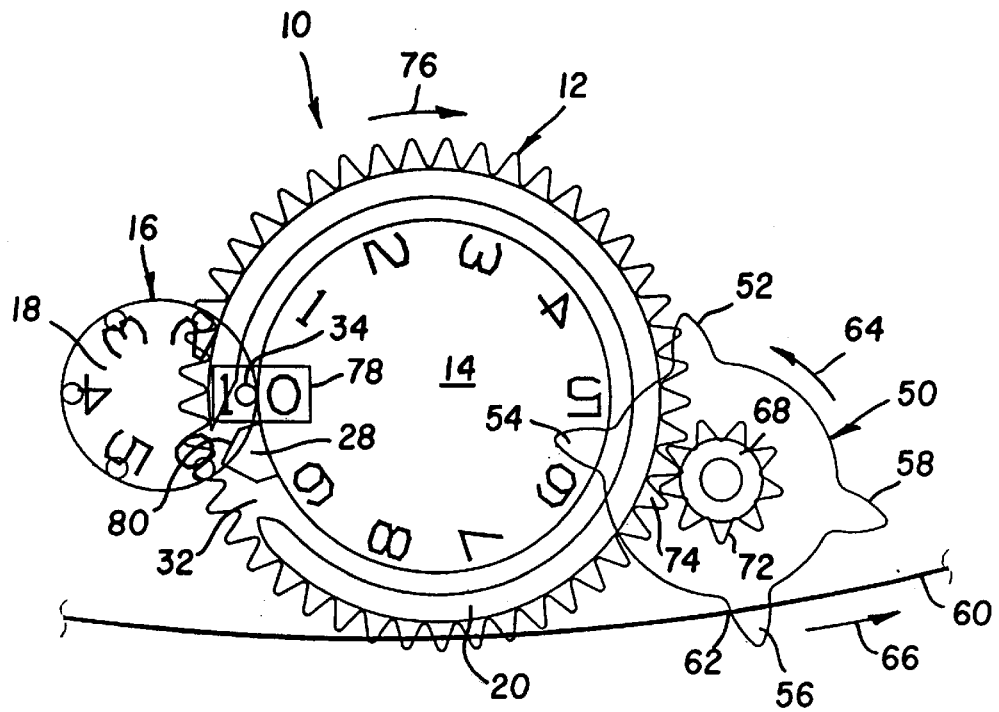
Figure 8:
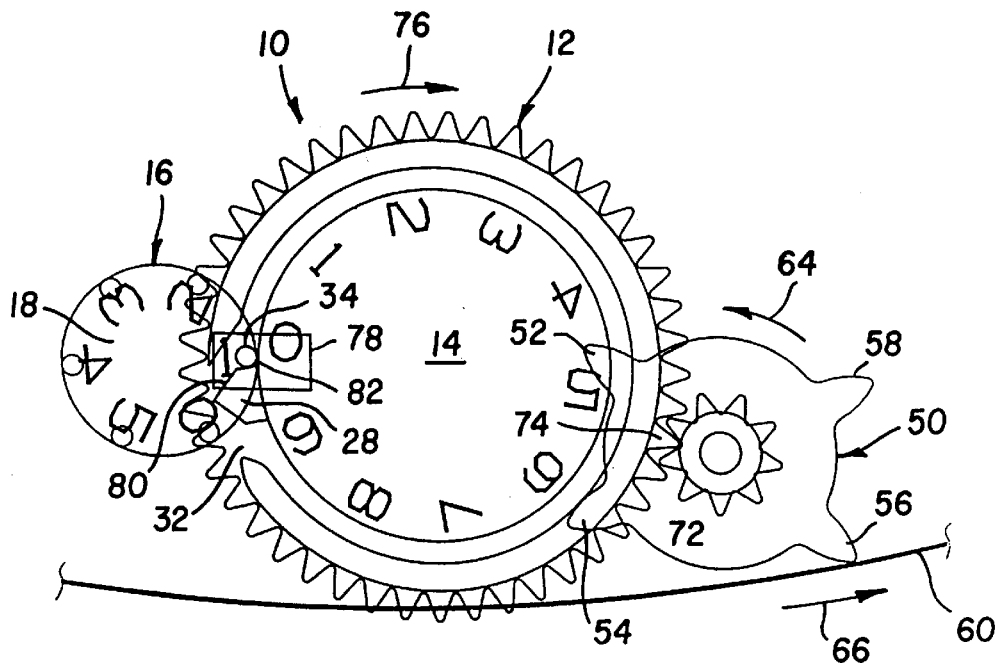
Figure 9:
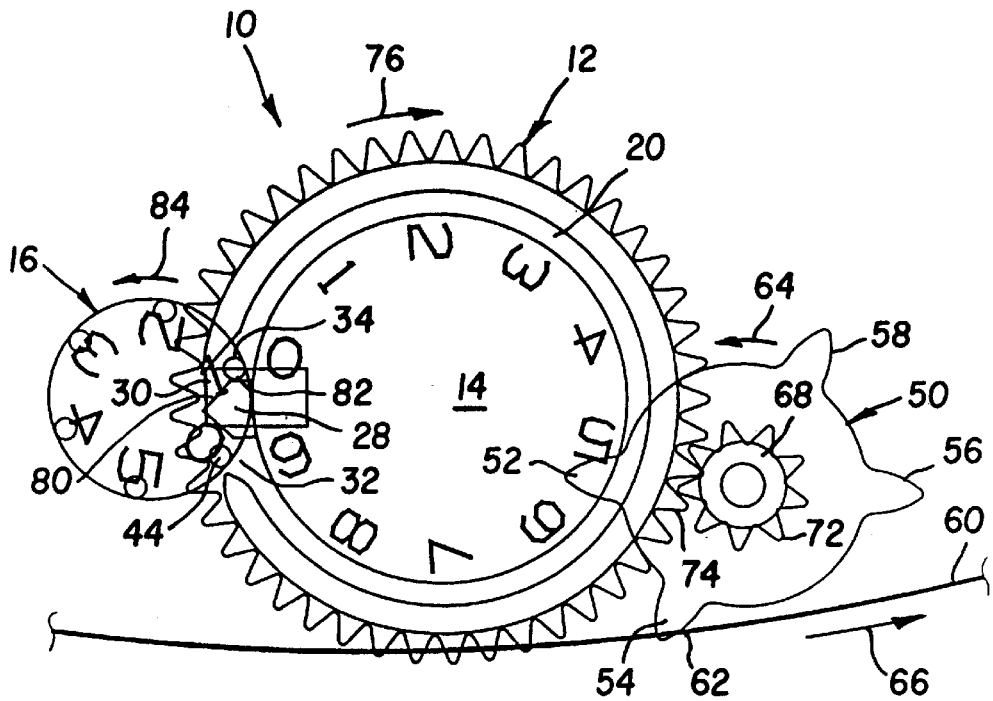
Figure 10:
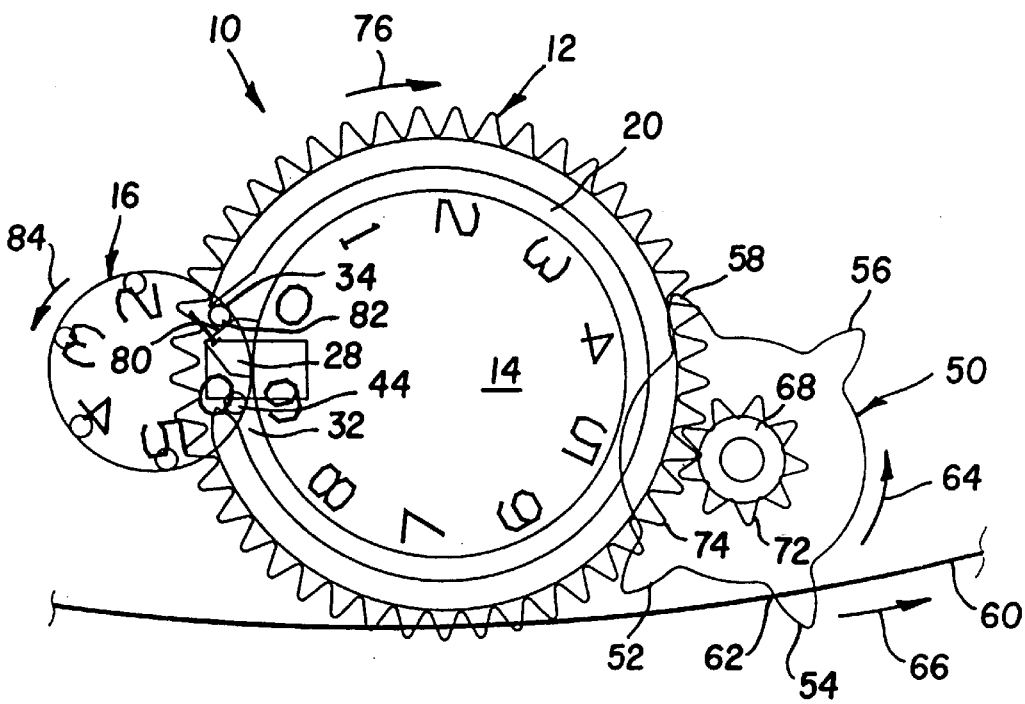

In FIGS. 4–7, the filmstrip 60 is advanced in the direction 66, following an exposure, from its metered position in FIG. 3 to another metered position in FIG. 7, to rotate the metering sprocket 50 one-hundred and eighty degrees in the direction 64, which first moves the metering tooth 52 out of one of the perforations 62, then moves the metering tooth 58 into and out of a second perforation, and finally moves the metering tooth 56 into a third perforation. Consequently, the unit counter wheel 12 is rotated thirty-six degrees in the direction 76 to move the unit "1" out of the counter window 78 and move the unit "0" into the counter window to indicate there are "10" frames remaining on the filmstrip 60 to be exposed. The pin 34 on the tenths counter wheel 16 remains in the channel 20, held captive between the pair of concentric outer and inner walls 46 and 48 of the channel. Thus, the tenths counter wheel 16 is not rotated.

Figure 11:
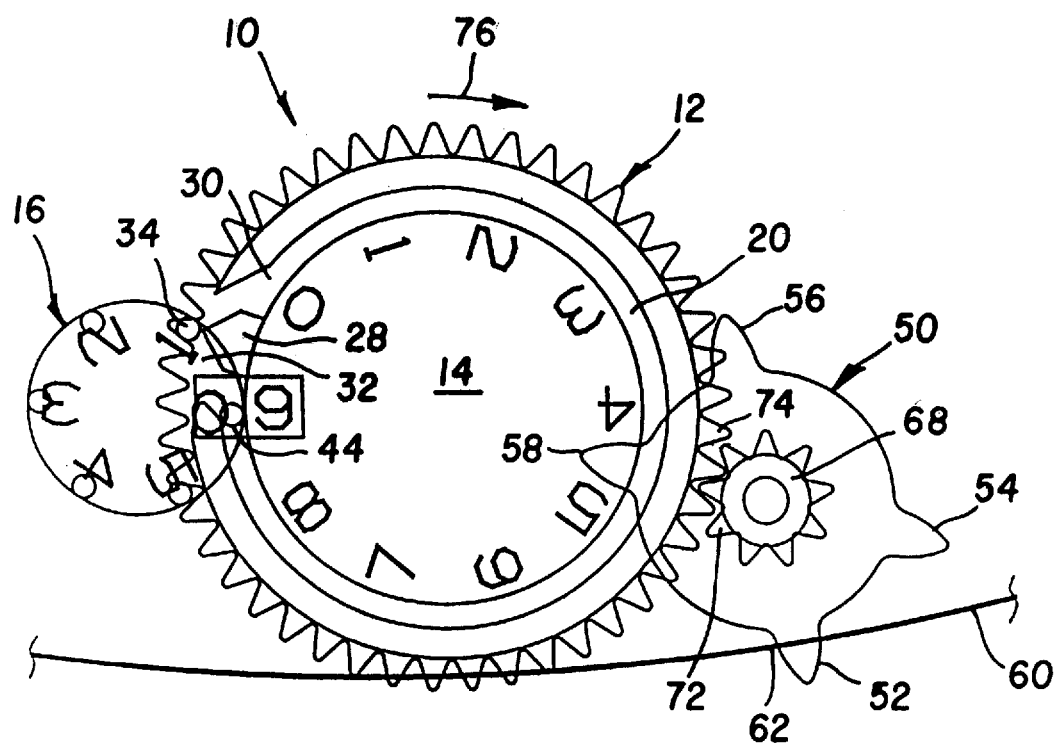

In FIGS. 8–11, the filmstrip 60 is advanced in the direction 66, following an exposure, from its metered position in FIG. 7 to another metered position in FIG. 11, to rotate the metering sprocket 50 one-hundred and eighty degrees in the direction 64, which first moves the metering tooth 56 out of one of the perforations 62, then moves the metering tooth 54 into and out of a second perforation, and finally moves the metering tooth 52 into a third perforation. Consequently, the unit counter wheel 12 is rotated thirty-six degrees in the direction 76 to move the unit "0" out of the counter window 78 and move the unit "9" into the counter window.

When the unit "0" on the unit counter wheel 12 is moved out of the counter window 78 and the unit "9" on the unit counter wheel is moved into the counter window, a beveled camming portion 80 of the protuberance 22 on the unit counter wheel 12 pushes against a curved cam follower portion 82 of the pin 34 on the tenths counter wheel 16 to drive that pin out of the channel 20 through the egress opening 30. This causes the tenths counter wheel 16 to be rotated seventy-two degrees in the direction 84 in FIGS. 9–11 to move the pin 44 on the tenths counter wheel into the channel through the ingress opening 32. Simultaneously, the unit "1" on the tenths counter wheel 16 is moved out of the counter window 78 and the unit "0" on the tenths counter wheel is moved into the counter window to indicate there are "09" frames remaining on the filmstrip 60 to be exposed.

The invention has been described with reference to a preferred embodiment. However, it will be appreciated that variations and modifications can be effected by a person of ordinary skill in the art without departing from the scope of the invention. For example, instead of there being five consecutive units "0", "1", "2", "3", "4" and "5" on the top side 18 of the tenths counter wheel 16, there can be more or less consecutive units. However, there must be a minimum of two consecutive units "0" and "1" on the top side 18 of the tenths counter wheel 16.

PARTS LIST 10. dual wheel frame counter
12. unit counter wheel
14. top side
16. tenths counter wheel
18. top side
20. channel
22. opening
24. end
26. end
28. actuating protuberance
30. egress space
32. ingress space
34. pin
36. pin
38. pin
40. pin
42. pin
44. pin
45. underside
46. outer wall
48. inner wall
50. metering sprocket
52. metering teeth
54. metering teeth
56. metering teeth
58. metering teeth
60. filmstrip
62. perforations
64. direction
66. direction
68. pinion
70. shaft
72. peripheral teeth
74. wheel teeth
76. direction
78. counter window
80. camming portion
82. cam follower portion
84. direction

What is claimed is:

1. A dual wheel frame counter comprising a tenths counter wheel having a series of at least two evenly spaced units and respective evenly spaced actuated members equal in number to the series of at least two units, and a unit counter wheel having a series of ten evenly spaced units which correspond to the series of at least two units of said tenths counter wheel and a single actuating member which successively actuates said actuated members to rotate the tenths counter wheel one unit in response to each rotation of said unit counter wheel ten units, is characterized in that:

said unit counter wheel includes an opposed-end concentric channel having an opening between opposite ends of said channel;

said single actuating member constitutes a protuberance on said unit counter wheel which is positioned in said opening to leave respective ingress and egress spaces in the opening between said protuberance and said opposite ends of the channel; and said actuated members are positioned on said tenths counter wheel for said protuberance to drive one of the actuated members out of said channel through said egress space to rotate the tenths counter wheel one unit and move another of the actuated members into the channel through said ingress space each time said unit counter wheel is rotated ten units.

2. A dual wheel frame counter as recited in claim 1, wherein said protuberance on said unit counter wheel has a camming portion and said actuated members on said tenths counter wheel have respective cam follower portions which, together, cooperate to move one of the actuated members out of said channel through said egress space each time said unit counter wheel is rotated ten units.

3. A dual wheel frame counter as recited in claim 1, wherein said actuated members on said tenths counter wheel constitute respective pins, and said units counter wheel has a pair of concentric inner and outer walls bounding said channel to hold whichever one of said pins is in said channel stationary to prevent unintended rotation of said tenths counter wheel with respect to said unit counter wheel.

* * * * *